US012679217B2

(12) United States Patent (10) Patent No.: US 12,679,217 B2

Isami et al. (45) Date of Patent: Jul. 14, 2026

(54) ELECTRIC VEHICLE

(71) Applicant: TOYOTA JIDOSHA KABUSHIKI KAISHA, Toyota (JP)

(72) Inventors: Yoichiro Isami, Mishima (JP); Kenji Mizutani, Toyota (JP); Hirotaka Ikegami, Toyota (JP); Akihito Yasue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 18/371,499

(22) Filed: Sep. 22, 2023

(65) Prior Publication Data

US 2024/0166057 A1 May 23, 2024

(30) Foreign Application Priority Data

Nov. 17, 2022 (JP) .................................. 2022-184176

(51) Int. Cl.
| | |
|---|---|
| *B60L 15/20* | (2006.01) |
| *B60K 26/02* | (2006.01) |
| *B60K 35/00* | (2024.01) |
| *B60L 15/00* | (2006.01) |
| *B60L 50/60* | (2019.01) |
| *B60K 35/22* | (2024.01) |
| *B60K 35/28* | (2024.01) |

(52) U.S. Cl.
CPC .............. *B60L 15/20* (2013.01); *B60K 26/02* (2013.01); *B60K 2026/025* (2013.01); *B60K 35/00* (2013.01); *B60K 35/22* (2024.01); *B60K 35/28* (2024.01); *B60K 2360/167* (2024.01);

*B60L 50/60* (2019.02); *B60L 2240/423* (2013.01); *B60L 2240/486* (2013.01); *B60L 2250/24* (2013.01); *B60L 2260/20* (2013.01)

(58) Field of Classification Search
USPC .......................................................... 701/22
See application file for complete search history.

(56) References Cited

U.S. PATENT DOCUMENTS

| | | | |
|---|---|---|---|
| 2015/0199955 A1* | 7/2015 | Draganic ................. | G08B 6/00 |
| | | | 381/86 |
| 2018/0281619 A1 | 10/2018 | Suzuki et al. | |
| 2019/0202437 A1* | 7/2019 | Paterno .................... | B60K 6/46 |
| 2021/0229550 A1 | 7/2021 | Isami | |
| 2021/0387529 A1 | 12/2021 | Oh et al. | |
| 2022/0041062 A1 | 2/2022 | Nishimine et al. | |

(Continued)

FOREIGN PATENT DOCUMENTS

| | | |
|---|---|---|
| JP | 2005-024082 A | 1/2005 |
| JP | 2011-213273 A | 10/2011 |

(Continued)

*Primary Examiner* — Adam D Tissot

(74) *Attorney, Agent, or Firm* — Dinsmore & Shohl LLP

(57) ABSTRACT

The electric vehicle of the present disclosure is configured to use an electric motor as a power unit for traveling. The electric vehicle includes an accelerator pedal, a sequential shifter, and a controller. The controller is configured to change a motor torque output by the electric motor in response to operation of the accelerator pedal and operation of the sequential shifter. The controller is configured to change a change rate of the motor torque at least twice during a preset shift time in response to the operation of the sequential shifter.

14 Claims, 13 Drawing Sheets

(56)        References Cited

U.S. PATENT DOCUMENTS

2022/0063494  A1      3/2022   Duo' et al.
2022/0089174  A1      3/2022   Oh et al.
2022/0379890  A1*    12/2022   Zecherle ............ B60W 30/182

FOREIGN PATENT DOCUMENTS

JP        2015-143098  A      8/2015
JP        2018-166386  A     10/2018
JP        2021-118569  A      8/2021
JP        2022-030838  A      2/2022
JP        2022-036845  A      3/2022
KR      2021-0153776  A     12/2021
KR      2022-0039934  A      3/2022
WO       2008/111478  A1     9/2008

* cited by examiner

531

ELECTRIC VEHICLE

CROSS-REFERENCE TO RELATED APPLICATION

The present application claims priority under 35 U.S.C. § 119 to Japanese Patent Application No. 2022-184176, filed Nov. 17, 2022, the contents of which application are incorporated herein by reference in their entirety.

BACKGROUND

Field

The present disclosure relates to an electric vehicle that uses an electric motor as a power unit for traveling.

Background Art

An electric motor used as a power unit for traveling in an electric vehicle has a torque characteristic greatly different from that of an internal combustion engine used as a power unit for traveling in a conventional vehicle. Due to differences in the torque characteristics of the power units, the conventional vehicle requires a transmission, whereas the electric vehicle generally does not have a transmission. As a matter of course, the electric vehicle is not provided with a manual transmission (MT) for switching a gear ratio by manual operation of a driver. For this reason, there is a large difference in driving feeling between driving of the conventional vehicle with MT (hereinafter referred to as an MT vehicle) and driving of the electric vehicle.

On the other hand, the electric motor can relatively easily control torque by controlling the applied voltage and field. Therefore, with the electric motor, it is possible to obtain a desired torque characteristic within an operating range of the electric motor by performing appropriate control. For example, JP2021-118569A and JP2022-036845A propose techniques for controlling the torque of electric vehicles to simulate the torque characteristics peculiar to an MT vehicle by utilizing this feature. The electric vehicles disclosed in these patent documents are provided with a pseudo shifter and a pseudo clutch pedal so that a driving feeling like that of an MT vehicle can be obtained.

SUMMARY

Since the operation of a clutch pedal is operation unique to an MT vehicle, installing a pseudo clutch pedal in an electric vehicle will appeal to a user who wants to enjoy a driving feeling like that of the MT vehicle with the electric vehicle. However, the operation of the clutch pedal is sometimes troublesome and difficult for a driver who is accustomed to driving a vehicle with an automatic transmission. In addition, if the required operation is only the operation of a shifter, it is possible to realize quicker gear stage switching.

It is estimated that there are a certain number of users who want to enjoy a driving feeling like that of the MT vehicle but are not good at or do not need to operate the clutch pedal. And it is presumed that the driving feel desired by such users is strictly that of a clutch pedal-less MT vehicle, which does not have a clutch pedal. In many cases, a sequential shifter is used in the clutch pedal-less MT vehicle. The driving feeling of the clutch pedal-less MT vehicle including the operation feeling of the sequential shifter is different from the driving feeling of a normal MT vehicle provided with a clutch pedal.

The electric vehicles disclosed in the above patent documents are designed to simulate the output characteristics of the normal MT vehicle equipped with the clutch pedal. For this reason, by simply removing the pseudo clutch pedal from the electric vehicles disclosed in the above patent documents, it is not possible to satisfy a user who desires a driving feeling like that of the clutch pedal-less MT vehicle having the sequential shifter.

The present disclosure has been made in view of the above problem. An object of the present disclosure is to provide an electric vehicle with which a driver can enjoy a driving feeling like that of a clutch pedal-less MT vehicle having a sequential shifter.

The present disclosure provides an electric vehicle configured as follows. The electric vehicle of the present disclosure includes an accelerator pedal, a sequential shifter, and a controller. The controller is configured to change the motor torque output by the electric motor in response to operation of the accelerator pedal and operation of the sequential shifter. The controller is configured to change a change rate of the motor torque at least twice during a preset shift time in response to the operation of the sequential shifter.

The sequential shifter may be, for example, a paddle shifter or a lever shifter. That is, the sequential shifter may have a structure and an operational feeling similar to those of a sequential shifter installed in a clutch pedal-less MT vehicle. However, as described above, the operation of the sequential shifter acts on the motor torque of the electric motor, and is different in function from the sequential shifter installed in the clutch pedal-less MT vehicle. In order to be distinguished from the sequential shifter installed in the clutch pedal-less MT vehicle, the sequential shifter included in the electric vehicle of the present disclosure is hereinafter referred to as a pseudo sequential shifter.

According to the configuration of the electric vehicle of the present disclosure, by the shift operation of the pseudo sequential shifter, the motor torque changes with the same output characteristics as the driving wheel torque of the clutch pedal-less MT vehicle when the sequential shifter is operated. Thus, a driver can enjoy a driving feeling like that of the clutch pedal-less MT vehicle having the sequential shifter with the electric vehicle.

The controller changing the change rate of the motor torque at least twice during the preset shift time may include the controller decreasing the motor torque to a minimum value and then increasing the motor torque again during the preset shift time. By temporarily reducing the motor torque, the driving feeling when the clutch is temporarily released by the shift operation of the sequential shifter in the clutch pedal-less MT vehicle is produced. In this case, the controller may set the minimum value to zero and may maintain the motor torque at zero for a preset time within the preset shift time. Further, the controller may cause the motor torque to overshoot a target value when the preset shift time elapses. The driving feeling obtained by the shift operation of the pseudo sequential shifter depends on the setting of the change characteristic of the motor torque within the preset shift time.

The exemplified change characteristic of the motor torque within the preset shift time may be applied to the upshift operation of the pseudo sequential shifter or may be applied to the downshift operation of the pseudo sequential shifter.

When the operation amount of the accelerator pedal is constant, the controller may cause a difference in the motor torque in accordance with the shift direction of the sequential shifter before and after elapse of the preset shift time. When the operation of the pseudo sequential shifter is upshift operation, the motor torque may be decreased before and after the elapse of the preset shift time. In the case of downshift operation of the pseudo sequential shifter, the motor torque may be increased before and after the elapse of the preset shift time.

The change characteristic of the motor torque within the preset shift time may be changeable. For example, when the electric vehicle of the present disclosure includes a drive mode selection switch, the controller may change the change characteristic of the motor torque within the preset shift time in accordance with the drive mode selected by the drive mode selection switch. According to this configuration, by appropriately selecting the drive mode, the driver can arbitrarily obtain a driving feeling suitable for his/her mood or a driving feeling corresponding to a driving situation.

The driving feeling obtained by the driver depends on visual information. Therefore, by visually representing the behavior of the clutch pedal-less MT vehicle, it is expected to provide the driver with a more realistic driving feeling. The electric vehicle of the present disclosure may include a pseudo engine speed meter as a device that visually expresses the behavior unique to the clutch pedal-less MT vehicle. The virtual engine speed of the clutch pedal-less MT vehicle simulated by the electric vehicle of the present disclosure is displayed on the pseudo engine speed meter. As one example, when upshift operation is performed on the pseudo sequential shifter, the pseudo engine speed meter may display a virtual engine speed monotonically decreasing during the preset shift time in response to the up shift operation. As another example, when downshift operation is performed on the pseudo sequential shifter, the pseudo engine speed meter may display a virtual engine speed increasing at a preset timing within the preset shift time in response to the downshift operation.

The calculation of the motor torque by the controller may be performed using a clutch pedal-less MT vehicle model simulating the output characteristics of the driving wheel torque in the clutch pedal-less MT vehicle. The clutch pedal-less MT vehicle model and the method of calculating the motor torque using the same will be described in the embodiments of the present disclosure described below.

As described above, according to the electric vehicle of the present disclosure, the driver can enjoy a driving feeling like that of the clutch pedal-less MT vehicle having the sequential shifter.

DETAILED DESCRIPTION

1. Configuration of Electric Vehicle

Figure 1:
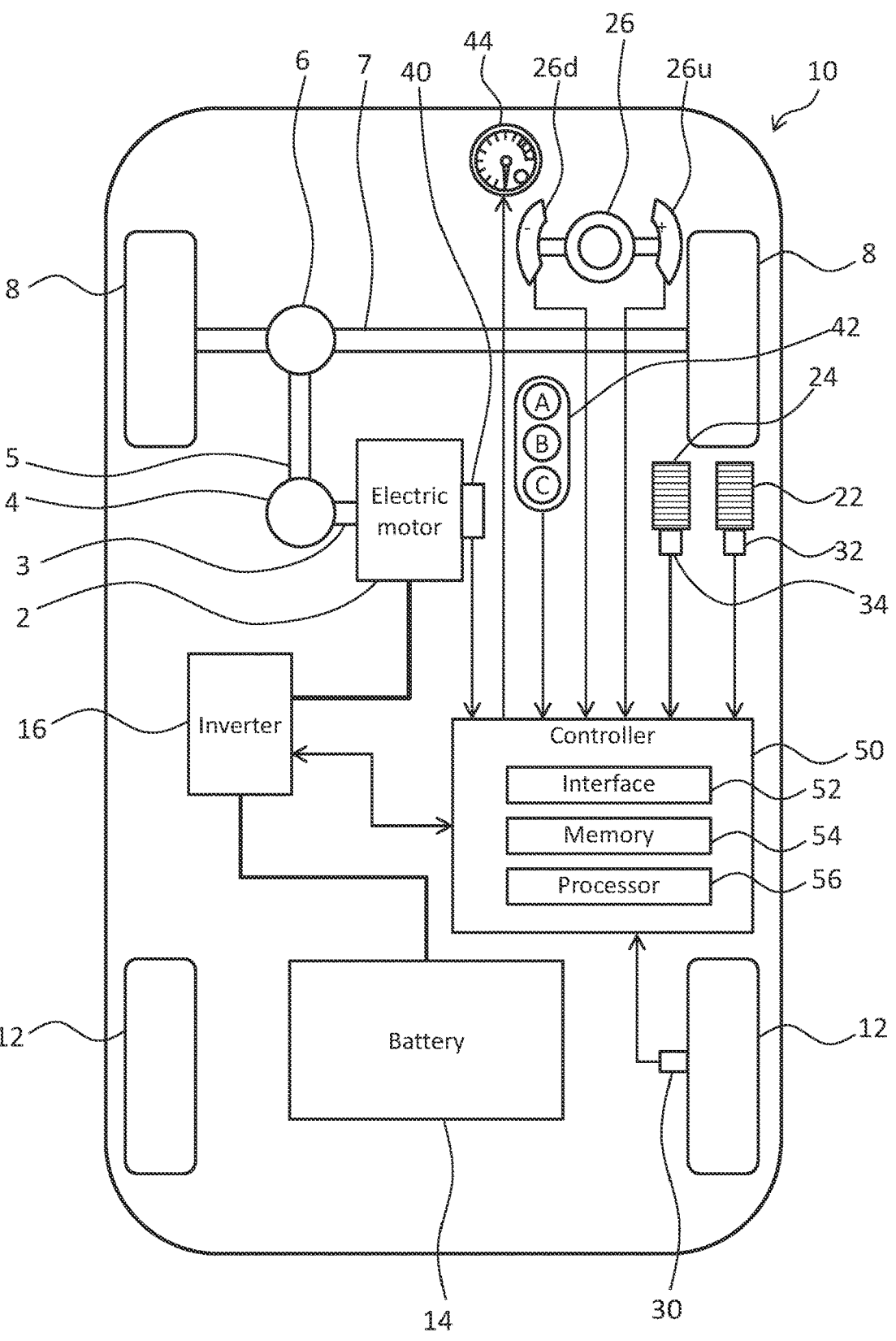
FIG. 1 schematically shows a configuration of an electric vehicle according to an embodiment of the present disclosure.

FIG. 1 is a diagram schematically showing a configuration of a power system of an electric vehicle 10 according to the present embodiment. As shown in FIG. 1, the electric vehicle 10 includes an electric motor 2 as a power unit. The electric motor 2 is, for example, a brushless DC motor or a three phase AC synchronous motor. The electric motor 2 is provided with a motor speed sensor 40 for detecting the rotational speed thereof. An output shaft 3 of the electric motor 2 is connected to one end of a propeller shaft 5 via a gear mechanism 4. The other end of the propeller shaft 5 is connected to a drive shaft 7 on the front side of the vehicle via a differential gear 6.

The electric vehicle 10 includes driving wheels 8 which are front wheels and driven wheels 12 which are rear wheels. The driving wheels 8 are provided at both ends of the drive shaft 7. Each wheel 8, 12 is provided with a wheel speed sensor 30. In FIG. 1, only the wheel speed sensor 30 for the right rear wheel is shown as a representative. The wheel speed sensor 30 is also used as a vehicle speed sensor for detecting the vehicle speed of the electric vehicle 10. The wheel speed sensor 30 is connected to a controller 50 to be described later by an in-vehicle network such as a controller area network (CAN).

The electric vehicle 10 includes a battery 14 and an inverter 16. The battery 14 stores electric energy for driving the electric motor 2. That is, the electric vehicle 10 is a battery electric vehicle (BEV) that travels on electric energy stored in the battery 14. The inverter 16 converts DC power input from the battery 14 into drive power for the electric motor 2. Power conversion by the inverter 16 is performed by PWM control by the controller 50. The inverter 16 is connected to the controller 50 by the in-vehicle network.

The electric vehicle 10 includes an accelerator pedal 22 for inputting an acceleration request and a brake pedal 24 for inputting a braking request as input devices for the driver to input an operation request to the electric vehicle 10. The accelerator pedal 22 is provided with an accelerator position sensor 32 for detecting an accelerator opening which is an operation amount of the accelerator pedal 22. The brake pedal 24 is provided with a brake position sensor 34 for detecting a brake depression amount which is an operation amount of the brake pedal 24. The accelerator position sensor 32 and the brake position sensor 34 are connected to the controller 50 via the in-vehicle network.

The electric vehicle 10 further includes a pseudo paddle shifter 26 as an input device. A paddle shifter, i.e., a paddle-type sequential shifter, is a device that operates a sequential manual transmission (SMT), but the electric vehicle 10 naturally does not have the SMT. The pseudo paddle shifter 26 is a dummy different from an original paddle shifter. In general, an MT vehicle including a paddle shifter is a clutch pedal-less MT vehicle that does not include a clutch pedal. Thus, the electric vehicle 10 includes the pseudo paddle shifter 26, but does not include a pseudo clutch pedal that mimics a clutch pedal.

The pseudo paddle shifter 26 has a structure similar to that of a paddle shifter installed in a clutch pedal-less MT vehicle. The pseudo paddle shifter 26 is attached to the steering wheel. The pseudo paddle shifter 26 includes an upshift switch 26u and a downshift switch 26d. The upshift switch 26u is provided on the right side of the steering wheel, and the downshift switch 26d is provided on the left side of the steering wheel. The upshift switch 26u and the downshift switch 26d can be operated independently. The upshift switch 26u generates a signal when pulled forward, and the downshift switch 26d also generates a signal when pulled forward. Hereinafter, the operation of pulling the upshift switch 26u forward is referred to as upshift operation, and the signal generated by the upshift switch 26u in response to the upshift operation is referred to as an upshift signal. Further, the operation of pulling the downshift switch 26d forward is referred to as downshift operation, and the signal generated by the downshift switch 26d in response to the downshift operation is referred to as a downshift signal. The upshift switch 26u and the downshift switch 26d are connected to the controller 50 via the in-vehicle network.

The electric vehicle 10 includes a drive mode selection switch 42. The drive mode selection switch 42 is a switch for selecting a drive mode of the electric vehicle 10. In the example shown in FIG. 1, three drive modes of A-mode, B-mode, and C-mode can be selected by the drive mode selection switch 42. The driving feeling given to the driver varies depending on the type of the drive mode. Examples of the drive mode may include a sport mode, a comfort mode, a racing mode, a normal mode, etc. The drive mode is associated with at least the output characteristics of the electric motor 2. The drive mode selection switch 42 is connected to the controller 50 via the in-vehicle network.

The electric vehicle 10 includes a pseudo engine speed meter 44. An engine speed meter is a device that displays the rotation speed of an internal combustion engine (hereinafter, simply referred to as engine) to the driver, but the electric vehicle 10 is naturally not provided with the engine. The pseudo engine speed meter 44 is a dummy different from an original engine speed meter. The pseudo engine speed meter 44 has a structure similar to an engine speed meter installed in a conventional vehicle. The pseudo engine speed meter 44 may be a mechanical type or a liquid crystal display type. Alternatively, a projection display system using a head-up display may be used. In the case of the liquid crystal display type or the projection display type, the rev limit may be arbitrarily set. The pseudo engine speed meter 44 is connected to the controller 50 via the in-vehicle network.

The controller 50 is typically an electronic control unit (ECU) mounted on the electric vehicle 10. The controller 50 may be a combination of a plurality of ECUs. The controller 50 includes an interface 52, a memory 54, and a processor 56. The in-vehicle network is connected to the interface 52. The memory 54 includes a RAM that temporarily stores data, and a ROM that stores programs executable by the processor 56 and various data related to the programs. Each program is composed of a plurality of instructions. The processor 56 reads programs and data from the memory 54 and executes them, and generates control signals based on signals acquired from each sensor.

Figure 2:
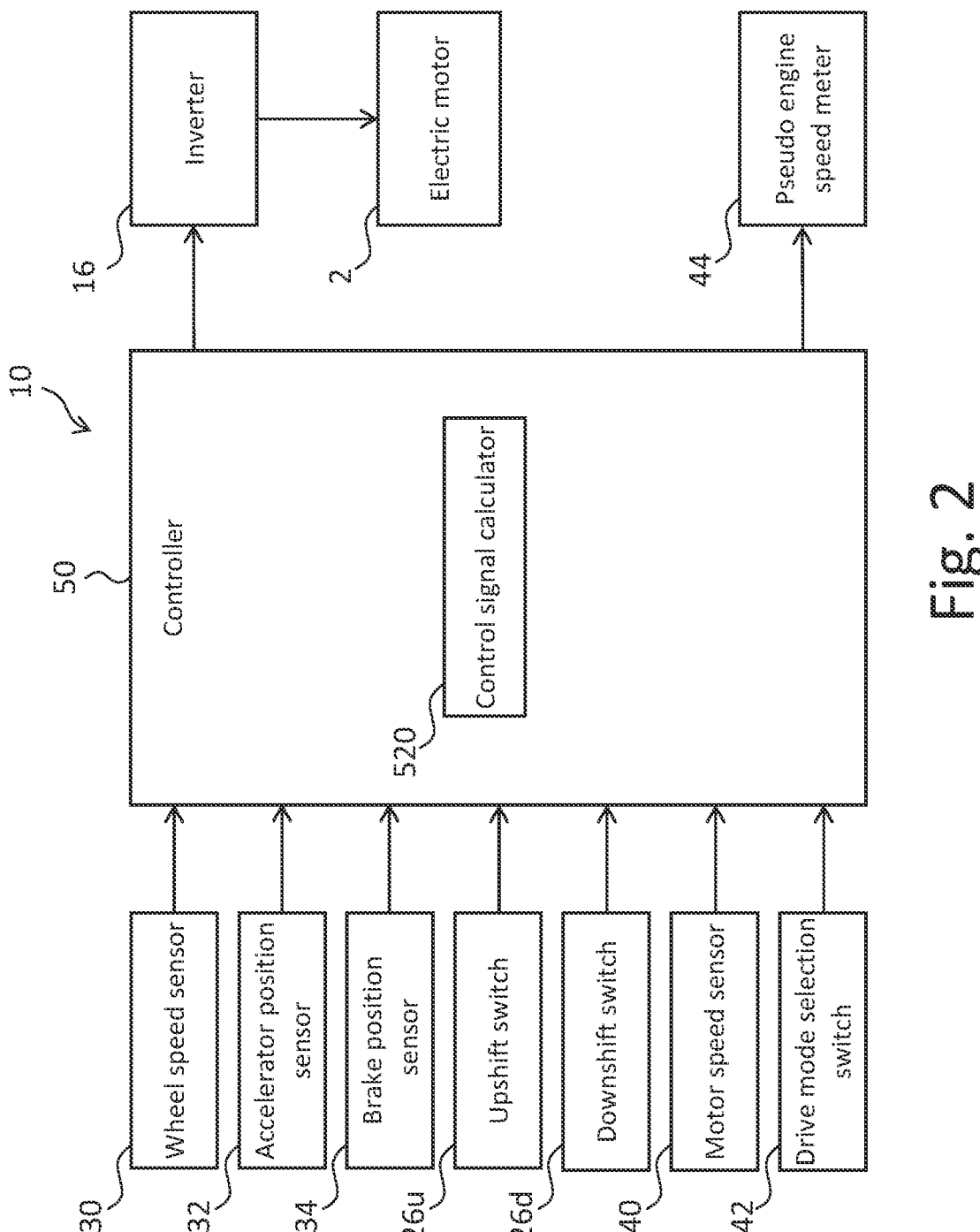
FIG. 2 shows a configuration of a control system of the electric vehicle shown in FIG. 1.

FIG. 2 is a block diagram showing a configuration of a control system of the electric vehicle 10 according to the present embodiment. The controller 50 receives inputs of signals from at least the wheel speed sensor 30, the accelerator position sensor 32, the brake position sensor 34, the upshift switch 26u, the downshift switch 26d, the motor speed sensor 40, and the drive mode selection switch 42. The in-vehicle network is used for communication between these sensors and the controller 50. Although not shown in the drawings, various other sensors are mounted on the electric vehicle 10 and connected to the controller 50 via the in-vehicle network.

The controller 50 also outputs signals to at least the inverter 16 and the pseudo engine speed meter 44. The in-vehicle network is used for communication between these devices and the controller 50. Although not shown in the drawings, various actuators and indicators other than these are mounted on the electric vehicle 10, and are connected to the controller 50 by the in-vehicle network.

The controller 50 has a function as a control signal calculator 520. Specifically, when the processor 56 executes a program stored in the memory 54, the processor 56 functions as at least the control signal calculator 520. The control signal calculation is a function of calculating a control signal for an actuator or a device. The control signal includes at least a signal for PWM-controlling the inverter 16 and a signal for displaying information on the pseudo engine speed meter 44. Hereinafter, functions of the controller 50 will be described.

2. Function of Controller 2-1. Motor Torque Calculation Function

Figure 3:
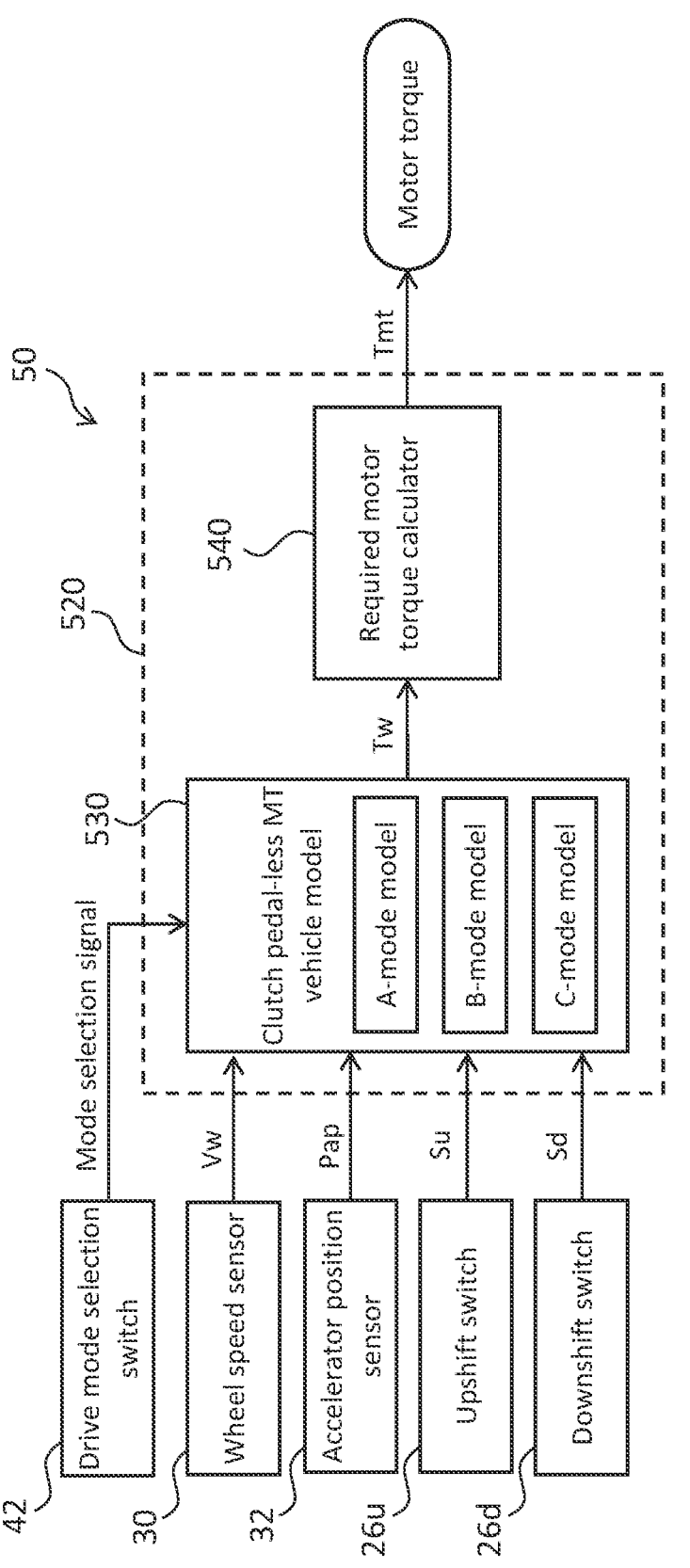
FIG. 3 shows functions of a controller of the electric vehicle shown in FIG. 1.

FIG. 3 is a block diagram showing functions of the controller 50 according to the present embodiment, particularly functions related to calculation of a motor torque command value for the electric motor 2. The controller 50 calculates the motor torque command value by the function shown in the block diagram, and generates a control signal for PWM-controlling the inverter 16 based on the motor torque command value.

As shown in FIG. 3, the control signal calculator 520 includes a clutch pedal-less MT vehicle model 530 and a required motor torque calculator 540. The control signal calculator 520 receives signals from at least the wheel speed sensor 30, the accelerator position sensor 32, the upshift switch 26u, the downshift switch 26d, and the drive mode selection switch 42. The control signal calculator 520 processes signals from these sensors and switches and calculates motor torque to be output by the electric motor 2.

The clutch pedal-less MT vehicle model 530 is a model for calculating the driving wheel torque that should be obtained by operating the accelerator pedal 22 and the pseudo paddle shifter 26 when the electric vehicle 10 is assumed to be the clutch pedal-less MT vehicle. The clutch pedal-less MT vehicle is an MT vehicle that includes an engine, an SMT, and a clutch connecting the engine and the SMT, but does not include a clutch pedal because the clutch is automatically operated. The driving wheel torque in the clutch pedal-less MT vehicle is determined by the operation of a gas pedal for controlling fuel supply to the engine and the operation of a paddle shifter for switching the gear stage of the SMT. The engine may be a spark-ignition engine or a diesel engine. Hereinafter, the engine, the clutch, and the SMT virtually implemented by the clutch pedal-less MT vehicle model 530 are referred to as a virtual engine, a virtual clutch, and a virtual SMT, respectively.

The clutch pedal-less MT vehicle model 530 receives an accelerator opening Pap detected by the accelerator position sensor 32 as an operation amount of the gas pedal of the virtual engine. The clutch pedal-less MT-vehicle model 530 receives an upshift signal Su transmitted from the upshift switch 26u and a downshift signal Sd transmitted from the downshift switch 26d as inputs for operating the paddle shifter that determines the gear stage of the virtual SMT. Further, a vehicle speed Vw (or wheel speed) detected by the wheel speed sensor 30 is also input to the clutch pedal-less MT vehicle model 530 as a signal indicating the vehicle load.

A mode selection signal is input to the clutch pedal-less MT vehicle model 530 from the drive mode selection switch 42. The clutch pedal-less MT vehicle model 530 includes a plurality of models simulating clutch pedal-less MT vehicles having different output characteristics. Each model is associated with a drive mode selected by the drive mode selection switch 42. In the example shown in FIG. 3, the clutch pedal-less MT vehicle model 530 includes an A-mode model corresponding to A-mode, a B-mode model corresponding to B-mode, and a C-mode model corresponding to C-mode. One model is selected from these models in accordance with the drive mode selected by the drive mode selection switch 42, and the selected model is used to calculate driving wheel torque Tw.

The required motor torque calculator 540 converts the driving wheel torque Tw calculated by the clutch pedal-less MT vehicle model 530 into required motor torque Tm. The required motor torque Tm is motor torque required to realize the driving wheel torque Tw calculated by the clutch pedal-less MT vehicle model 530. A reduction ratio from the output shaft 3 of the electric motor 2 to the driving wheels 8 is used to convert the driving wheel torque Tw into the required motor torque Tm.

2-2. Clutch Pedal-less MT Vehicle Model

2-2-1. Overview

Figure 4:
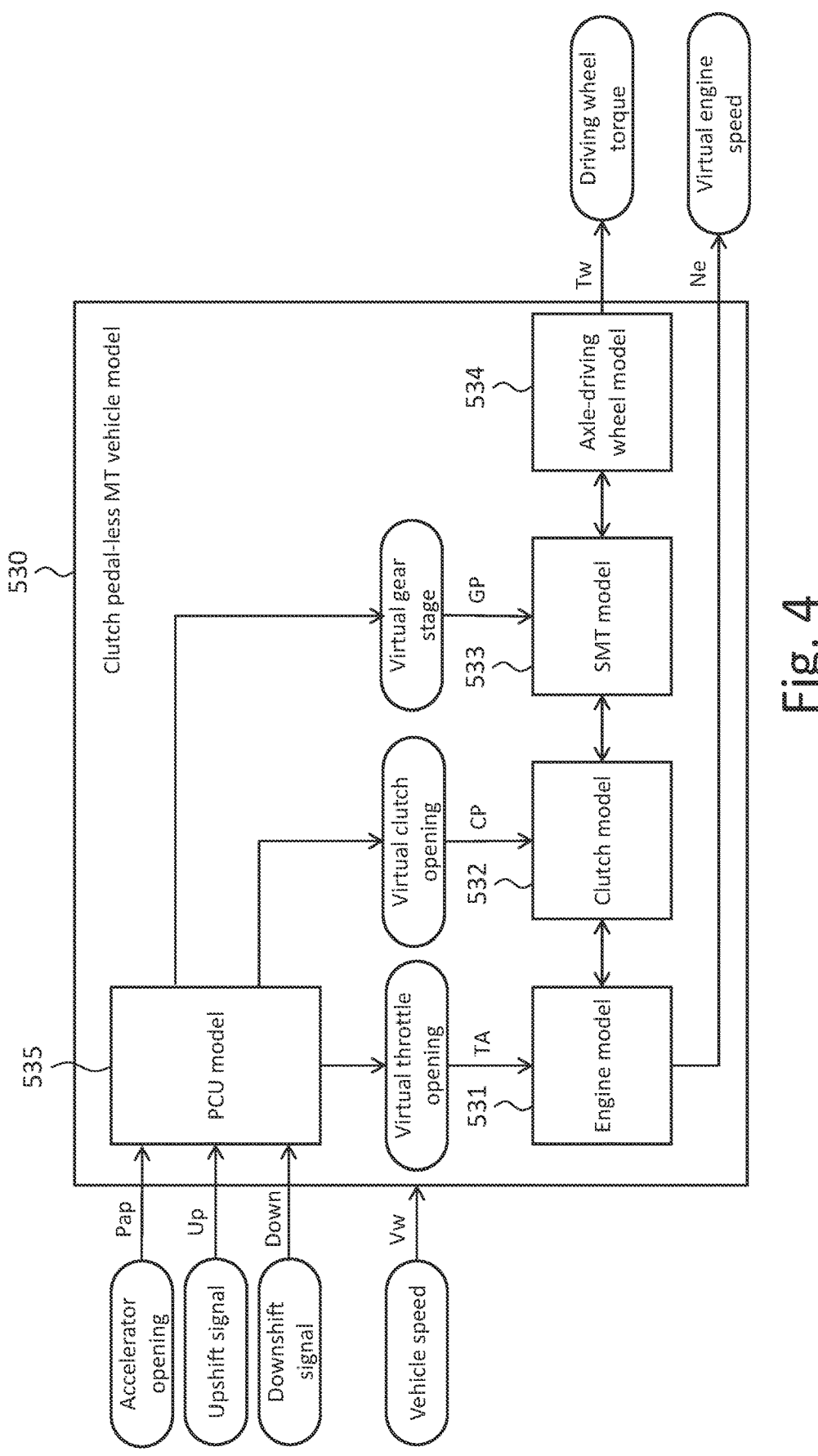
FIG. 4 shows an example of a clutch pedal-less MT vehicle model included in the controller shown in FIG. 3.

Next, the clutch pedal-less MT vehicle model 530 will be described. FIG. 4 is a block diagram showing an example of a clutch pedal-less MT vehicle model 530. The clutch pedal-less MT vehicle model 530 includes an engine model 531, a clutch model 532, an SMT model 533, an axle-driving wheel model 534, and a PCU model 535. In the engine model 531, a virtual engine is modeled. The virtual engine of the present embodiment is a spark ignition type engine whose torque is controlled by the throttle opening of a throttle. In the clutch model 532, a virtual clutch is modeled. In the SMT model 533, a virtual SMT is modeled. In the axle-driving wheel model 534, a virtual torque transmission system from the axle to the driving wheels is modeled. In the PCU model 535, some functions of a virtual plant control unit (PCU) that integrally controls the virtual engine, the virtual clutch, and the virtual SMT are modeled. Each model may be represented by, for example, a calculation formula or a map.

Calculation results are input and output between the models. The accelerator opening Pap, the upshift signal Su, and the downshift signal Sd input to the clutch pedal-less MT vehicle model 530 are used by the PCU model 535. The vehicle speed Vw (or wheel speed) is used in a plurality of models. The clutch pedal-less MT vehicle model 530 calculates the driving wheel torque Tw and the virtual engine speed Ne based on these input signals.

2-2-2. PCU Model

The PCU model 535 calculates a virtual throttle opening of the virtual engine, a virtual clutch opening of the virtual clutch, and a virtual gear stage of the virtual SMT. The PCU model 535 includes a throttle opening model for calculating the virtual throttle opening, a clutch opening model for calculating the virtual clutch opening, and a gear stage model for calculating the virtual gear stage.

The throttle opening model receives inputs of the accelerator opening Pap, the upshift signal Su, and the downshift signal Sd, and outputs the virtual throttle opening TA. In the throttle opening model, the virtual throttle opening TA is associated with the accelerator opening Pap, and the virtual throttle opening TA is increased as the accelerator opening Pap increases. However, when the upshift signal Su is input and when the downshift signal Sd is input, the virtual throttle opening TA is temporarily decreased regardless of the accelerator opening Pap. This means that the virtual throttle is temporarily closed when the shift operation of the pseudo paddle shifter 26 is performed. The virtual throttle opening TA output from the throttle opening model is input to the engine model 531.

The clutch opening model receives the upshift signal Su and the downshift signal Sd and outputs the virtual clutch opening CP. The virtual clutch opening CP is basically set to 0%. That is, the basic state of the virtual clutch is the engaged state. When the upshift signal Su is input and when the downshift signal Sd is input, the virtual clutch opening CP is temporarily set to 0%. This means that the virtual clutch is temporarily released when the shift operation of the pseudo paddle shifter 26 is performed. The vehicle speed Vw and the virtual engine speed are used for calculation of the virtual clutch opening CP when the virtual clutch is engaged. The clutch opening model calculates the virtual clutch opening CP based on the rotation speed difference so that the rotation speed of the input shaft of the virtual SMT calculated from the vehicle speed Vw and the virtual engine speed smoothly coincide with each other. The virtual clutch opening CP output from the clutch opening model is input to the clutch model 532.

The gear stage model receives the upshift signal Su and the downshift signal Sd and outputs the virtual gear stage GP. The number of gears of the virtual SMT is N (N is a natural number equal to or greater than 2). The virtual gear stage GP is raised by one stage each time the upshift signal Su is input. However, when the virtual gear stage GP is at the N-th stage, the virtual gear stage GP is maintained at the N-th stage even when the upshift signal Su is input. Further, the virtual gear stage GP is lowered by one stage each time the downshift signal Sd is input. However, when the virtual gear stage GP is the first stage, the virtual gear stage GP is maintained at the first stage even when the downshift signal Sd is input. The virtual gear stage GP output from the gear stage model is input to the SMT model 533.

2-2-3. Engine Model

The engine model 531 calculates a virtual engine speed Ne and virtual engine output torque Teout. The engine model 531 includes a model for calculating the virtual engine speed Ne and a model for calculating the virtual engine output torque Teout. For calculation of the virtual engine speed Ne, for example, a model expressed by the following equation (1) is used. In the following equation (1), the virtual engine speed Ne is calculated from a rotation speed Nw of the wheel 8, a total reduction ratio R, and a slip ratio Rslip of the virtual clutch.

$$Ne = Nw \times R \times 1/(1 - Rslip) \tag{1}$$

In the equation (1), the rotation speed Nw of the wheel 8 is detected by the wheel speed sensor 30. The total reduction ratio R is calculated from the gear ratio (transmission gear ratio) r calculated by the SMT model 533 described later and the reduction ratio defined by the axle-driving wheel model 534. The slip ratio Rslip is calculated by the clutch model 532 described later. The virtual engine speed Ne is displayed on the pseudo engine speed meter 44.

The equation (1) is a calculation equation of the virtual engine speed Ne in a state in which the virtual engine and the virtual SMT are connected by the virtual clutch. When the virtual clutch is disengaged, the virtual engine torque Te generated by the virtual engine can be regarded as being used to increase the virtual engine speed Ne. The virtual engine torque Te is torque obtained by adding torque due to the moment of inertia to the virtual engine output torque Teout. When the virtual clutch is disengaged, the virtual engine output torque Teout is zero. Therefore, when the virtual clutch is disengaged, the engine model 531 calculates the virtual engine speed Ne by the following equation (2) using the virtual engine torque Te and an inertia moment J of the virtual engine. A map using the virtual throttle opening TA as a parameter is used for calculation of the virtual engine torque Te.

$$J \times 30/\pi \times d/dt\, Ne = Te \tag{2}$$

During idling of the clutch pedal-less MT vehicle, idle speed control is performed to maintain the engine speed at a constant rotation speed. Therefore, when the virtual clutch is disengaged, the vehicle speed is zero, and the virtual throttle opening TA is 0%, the engine model 531 calculates the virtual engine speed Ne as a preset idling speed (for example, 1000 rpm). When the driver performs racing by depressing the accelerator pedal 22 while the vehicle is stopped, the idling speed is used as an initial value of the virtual engine speed Ne calculated by the equation (2).

Figure 5:
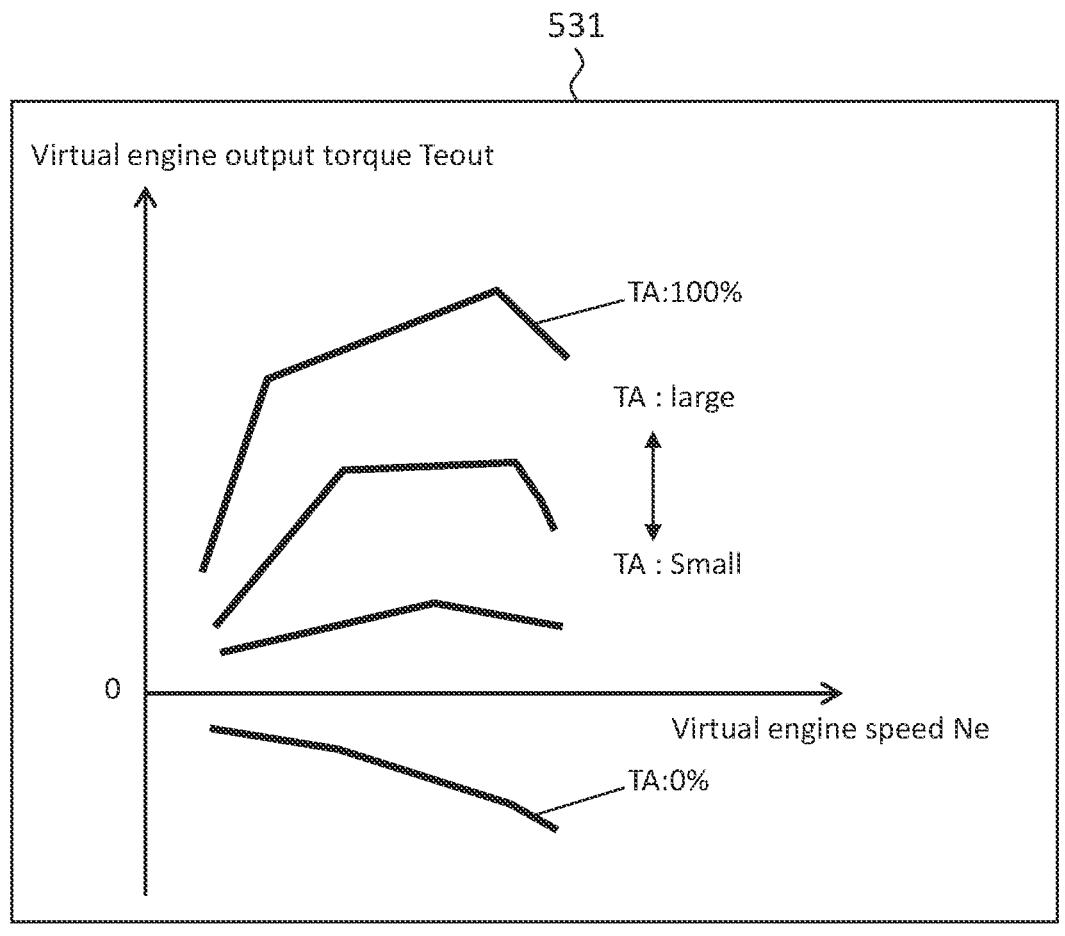
FIG. 5 shows an example of an engine model constituting the clutch pedal-less MT vehicle model shown in FIG. 4.

The engine model 531 calculates the virtual engine output torque Teout from the virtual engine speed Ne and the virtual throttle opening TA. For example, a map as shown in FIG. 5 is used for the calculation of the virtual engine output torque Teout. This map defines the relationship between the virtual throttle opening TA, the virtual engine speed Ne, and the virtual engine output torque Teout in the steady state. In this map, the virtual engine output torque Teout with respect to the virtual engine speed Ne is given for each virtual throttle opening TA. The torque characteristic shown in FIG. 5 can be set to a characteristic assuming a naturally aspirated engine or can be set to a characteristic assuming a supercharged engine. Further, the torque characteristic shown in FIG. 5 can be set to a characteristic assuming a diesel engine by replacing the virtual throttle opening TA with a virtual fuel injection amount. The virtual engine output torque Teout calculated by the engine model 531 is input to the clutch model 532.

2-2-4. Clutch Model

Figure 6:
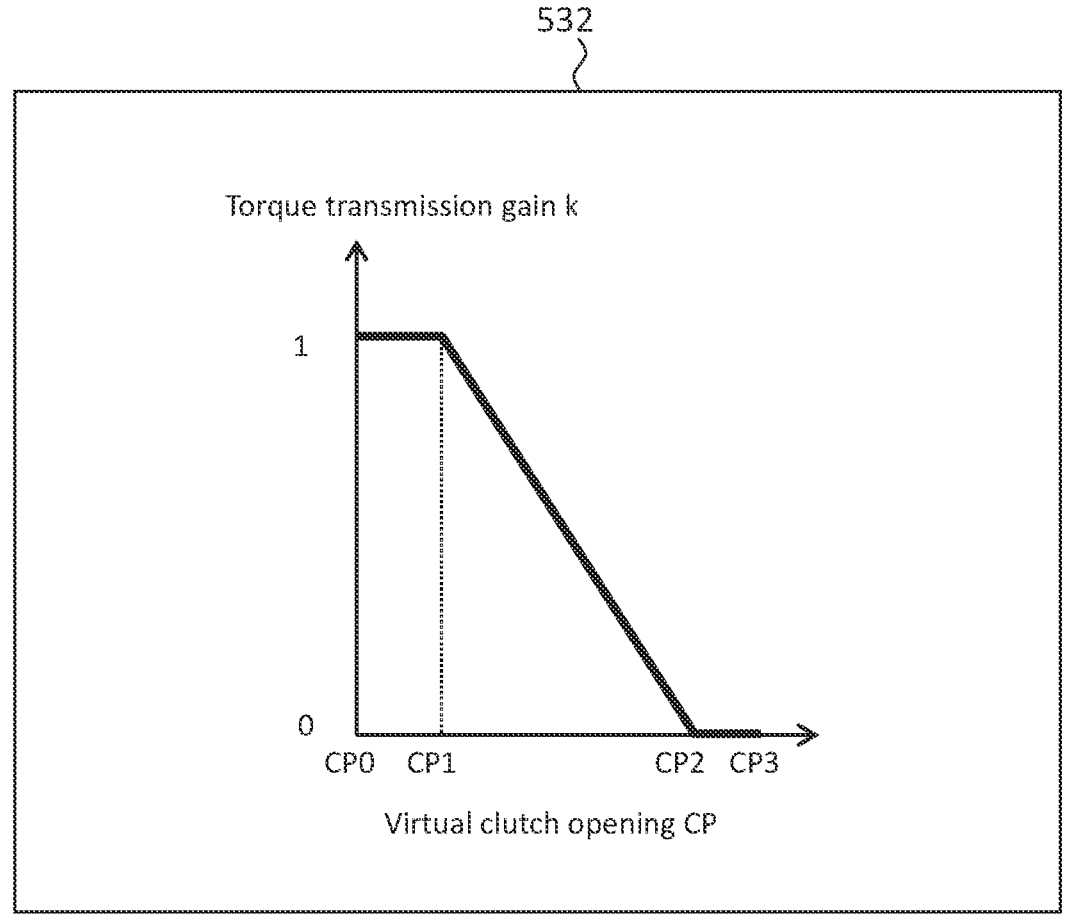
FIG. 6 shows an example of a clutch model constituting the clutch pedal-less MT vehicle model shown in FIG. 4.

The clutch model 532 calculates a torque transmission gain k. The torque transmission gain k is a gain for calculating a torque transmission rate of the virtual clutch corresponding to the virtual clutch opening CP. The clutch model 532 has a map as shown in FIG. 6, for example. In this map, the torque transmission gain k is given to the virtual clutch opening CP. In FIG. 6, the torque transmission gain k is given to keep one when the virtual clutch opening CP is in the range from CP0 to CP1, monotonically decrease from one to zero as the virtual clutch opening CP changes from CP1 to CP2, and keep zero when the virtual clutch opening CP is in the range from CP2 to CP3. Here, CP0 corresponds to a clutch opening of 0%, and CP3 corresponds to a clutch opening of 100%. The range from CP0 to CP1 and the range from CP2 to CP3 are dead zones in which the torque transmission gain k does not change depending on the virtual clutch opening CP.

The clutch model 532 calculates clutch output torque Tcout using the torque transmission gain k. The clutch output torque Tcout is torque output from the virtual clutch. The clutch model 532 calculates the clutch output torque Tcout from the virtual engine output torque Teout and the torque transmission gain k by, for example, the following equation (3). The clutch output torque Tcout calculated by the clutch model 532 is input to the SMT model 533.

$$Tcout = Teout \times k \tag{3}$$

Further, the clutch model 532 calculates the slip ratio Rslip. The slip ratio Rslip is used to calculate the virtual engine speed Ne in the engine model 531. For the calculation of the slip ratio Rslip, it is possible to use a map in which the slip ratio Rslip is given for a clutch pedal depression amount Pc, similarly to the torque transmission gain k. Instead of such a map, the slip ratio Rslip may be calculated from the torque transmission gain k by the following equation (4) representing the relationship between the slip ratio Rslip and the torque transmission gain k.

$$Rslip = 1 - k \tag{4}$$

2-2-5. SMT Model

Figure 7:
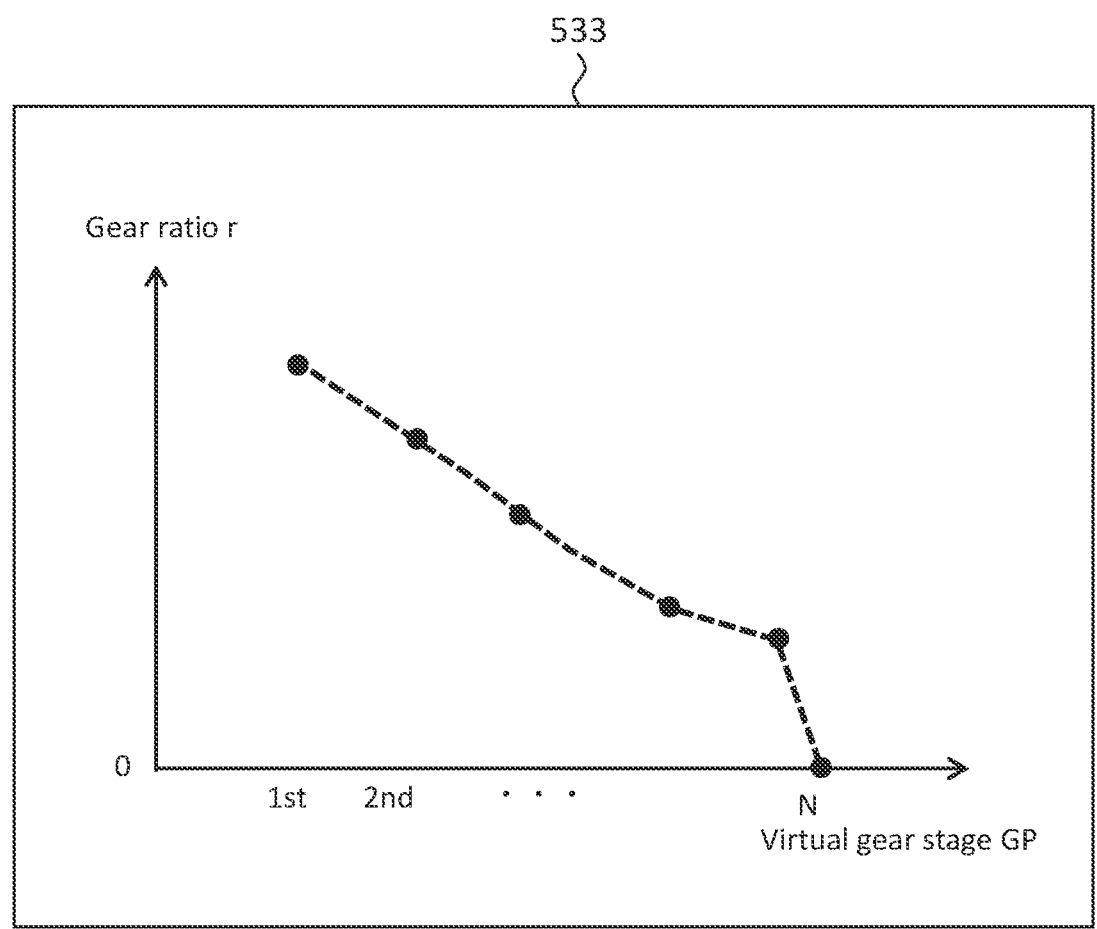
FIG. 7 shows an example of a sequential transmission model constituting the clutch pedal-less MT vehicle model shown in FIG. 4.

The SMT model 533 calculates a gear ratio r. The gear ratio r is a gear ratio determined by the virtual gear stage GP in the virtual SMT. The SMT model 533 has a map as shown in FIG. 7, for example. In this map, the gear ratio r is given for the virtual gear stage GP. As shown in FIG. 7, the larger the virtual gear stage GP, the smaller the gear ratio r.

The SMT model 533 calculates transmission output torque Tgout using the gear ratio r. The transmission output torque Tgout is torque output from the virtual SMT. The MT model 533 calculates the transmission output torque Tgout from the clutch output torque Tcout and the gear ratio r by, for example, the following equation (5). The transmission output torque Tgout calculated by the MT model 533 is input to the axle-driving wheel model 534.

$$Tgout = Tcout \times r \tag{5}$$

2-2-5. Axle-Driving Wheel Model

The axle-driving wheel model 534 calculates the driving wheel torque Tw using a preset reduction ratio rr. The reduction ratio rr is a fixed value determined by a mechanical structure from the virtual SMT to the driving wheel 8. A value obtained by multiplying the reduction ratio rr by the gear ratio r is the above-mentioned total reduction ratio R.

The axle-driving wheel model 534 calculates the driving wheel torque Tw from the transmission output torque Tgout and the reduction ratio rr by, for example, the following equation (6). The driving wheel torque Tw calculated by the axle-driving wheel model 534 is input to the required motor torque calculator 540.

$$Tw = Tgout \times rr \qquad (6)$$

Figure 8:
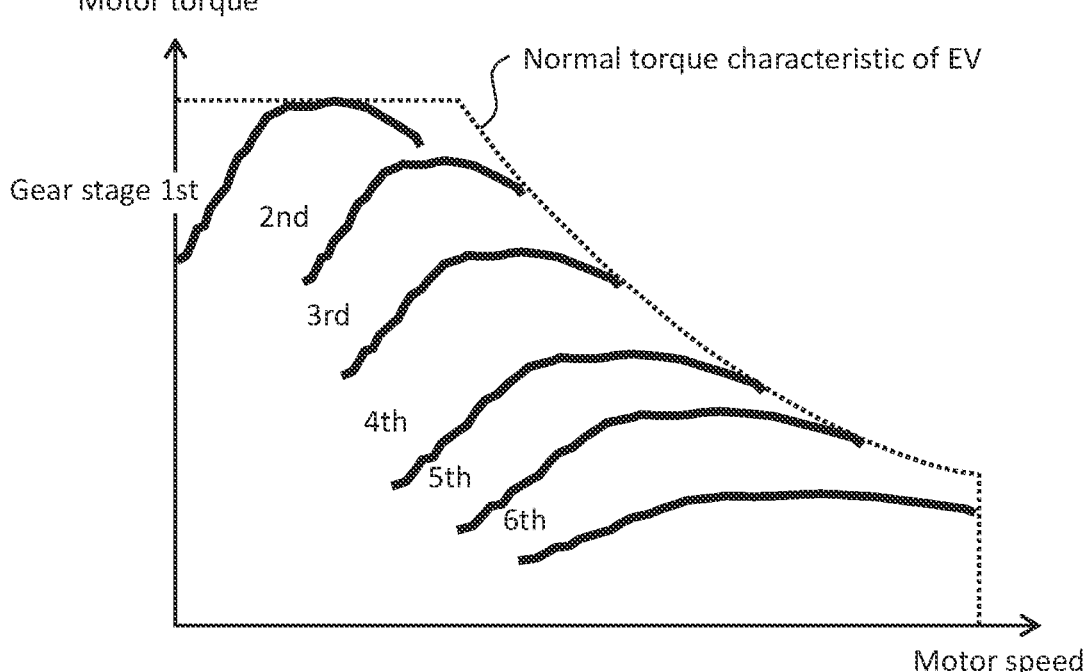
FIG. 8 shows torque characteristics of an electric motor implemented by motor control using the clutch pedal-less MT vehicle model in comparison with torque characteristics of an electric motor implemented by normal motor control for an electric vehicle.

2-3. Torque Characteristics of Electric Motor Implemented in Clutch Pedal-less MT Vehicle Model The required motor torque calculator 540 converts the driving wheel torque Tw calculated by the clutch pedal-less MT vehicle model 530 into motor torque. FIG. 8 is a diagram showing the torque characteristic of the electric motor 2 implemented by the motor control using the clutch pedal-less MT vehicle model 530 in comparison with the torque characteristic of the electric motor 2 implemented by the normal motor control for an electric vehicle (EV). According to the motor control using the clutch pedal-less MT vehicle model 530, as shown in FIG. 8, a torque characteristic (solid line in the drawing) simulating the torque characteristic of the clutch pedal-less MT vehicle can be implemented in accordance with the virtual gear stage set by the pseudo paddle shifter 26. In FIG. 8, the number of gear stages of the virtual SMT is six.

3. Example of Motor Torque Control in Response to Shift Operation

3-1. Example of Motor Torque Control in Response to Upshift Operation

Figure 9:
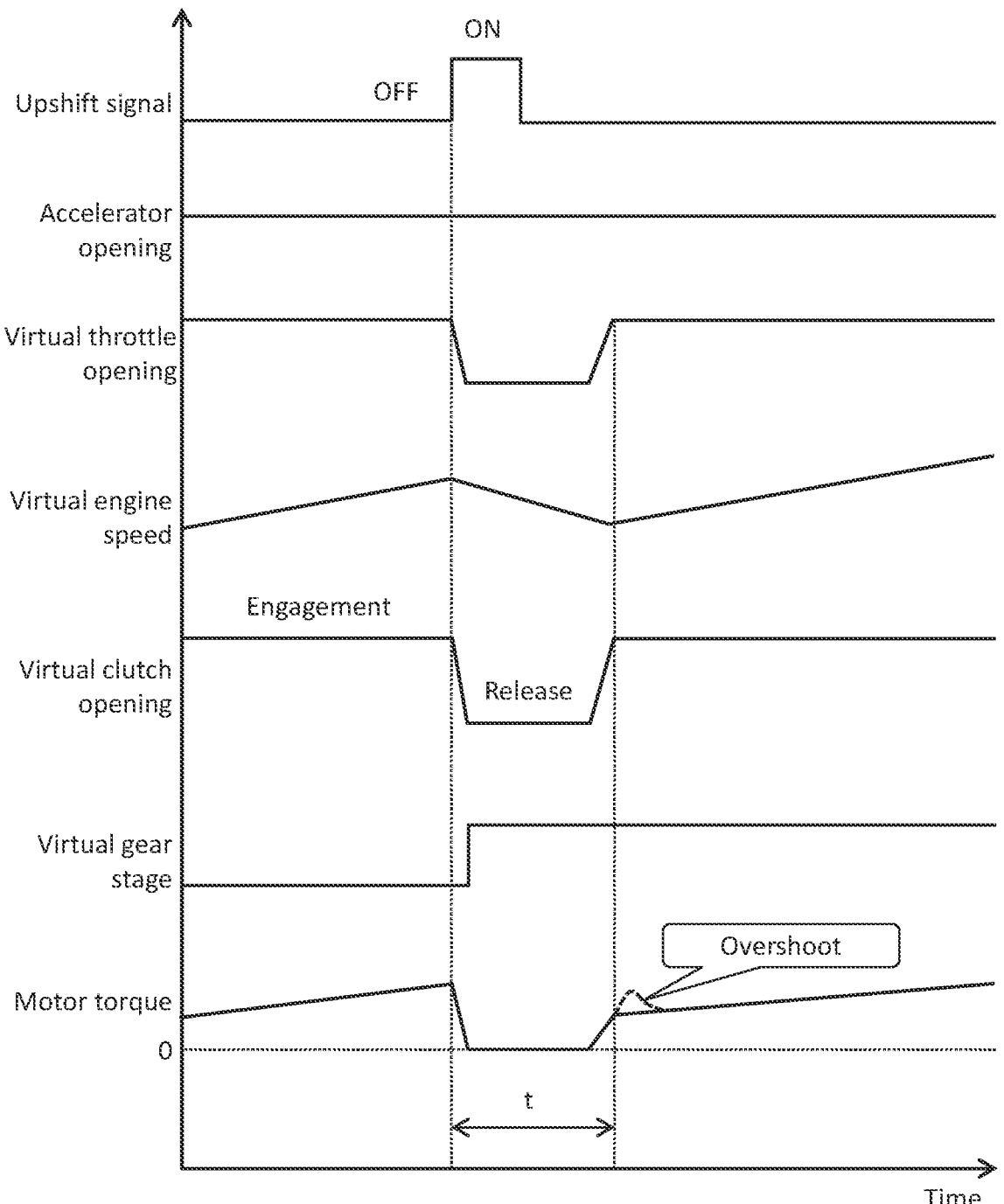
FIG. 9 shows an example of calculation of the motor torque using the clutch pedal-less MT vehicle model executed in response to upshift operation.

FIG. 9 is a diagram showing an example of calculation of the motor torque using the clutch pedal-less MT vehicle model 530 executed in response to the upshift operation of the pseudo paddle shifter 26. In the example shown in FIG. 9, the upshift operation is performed while the accelerator opening is kept constant during acceleration of the electric vehicle 10.

An upshift signal is input from the upshift switch 26*u* by the upshift operation of the pseudo paddle shifter 26. In response to the input of the upshift signal, the PCU model 535 of the clutch pedal-less MT vehicle model 530 decreases the virtual throttle opening at a preset speed, and simultaneously increases the virtual clutch opening at a preset speed. At substantially the same timing as the timing at which the virtual throttle opening becomes 0% and the virtual throttle is completely closed, the virtual clutch opening becomes 100% and the virtual clutch is completely released.

At the timing when the virtual throttle is completely closed and the virtual clutch is completely released, the PCU model 535 increases the virtual gear stage of the virtual SMT by one stage. Then, at a timing when a preset time has elapsed after the virtual gear stage is increased by one stage, the PCU model 535 increases the virtual throttle opening at a preset speed and simultaneously decreases the virtual clutch opening at a preset speed. At substantially the same timing as the timing at which the virtual throttle opening returns to the original opening before the upshift operation, the virtual clutch opening becomes 0% and the virtual clutch is completely engaged. Thus, the upshift of the virtual SMT is completed. In this specification, a time point at which the upshift operation of the pseudo paddle shifter 26 is detected is defined as a start time point of the upshift, and a time point at which the virtual clutch is completely engaged is defined as a completion time point of the upshift. In the present specification, a time (time t shown in FIG. 9) from the start time point of the upshift to the completion time point of the upshift is defined as a shift time of the upshift.

During the shift time, since the virtual clutch is released and the virtual throttle is closed, the virtual engine rotates by inertia. As a result, the virtual engine speed monotonically decreases during the shift time. When the virtual clutch is engaged again and the virtual throttle is opened again, the virtual engine speed starts to increase again. Since the driving feeling obtained by the driver depends on the visual information, the virtual engine speed changing in response to the upshift operation is displayed on the pseudo engine speed meter 44, so that a real driving feeling is given to the driver.

The bottom row of FIG. 9 shows changes in the motor torque achieved by changing the virtual throttle opening, the virtual clutch opening, and the virtual gear stage in response to the upshift operation as described above. In the example shown in FIG. 9, the motor torque decreases as the disengagement of the virtual clutch progresses, and decreases to zero at the time point when the virtual clutch is completely disengaged. While the virtual clutch is released, the motor torque is maintained at zero. When the engagement of the virtual clutch is started soon, the motor torque increases as the engagement of the virtual clutch progresses. However, the motor torque at the time point when the virtual clutch is completely engaged and the upshift is completed is set lower than the motor torque at the time point when the upshift is started. That is, in the motor torque control in response to the upshift operation, the motor torque is decreased before and after the elapse of the shift time. By controlling the motor torque as described above, the driver can enjoy a driving feeling in the electric vehicle 10 as if he/she performs upshift operation using the paddle shifter in the clutch pedal-less MT vehicle.

After completion of the upshift, the motor torque corresponding to the virtual gear stage and the virtual throttle opening is calculated. However, immediately after the elapse of the shift time, the motor torque may be caused to overshoot a target value determined from the virtual gear stage and the virtual throttle opening, as indicated by the broken line in FIG. 9, in consideration of the inertia caused by the rotation of the virtual engine. Alternatively, conversely, the motor torque may be made to undershoot the target value determined from the virtual gear stage and the virtual throttle opening.

Figure 10A:
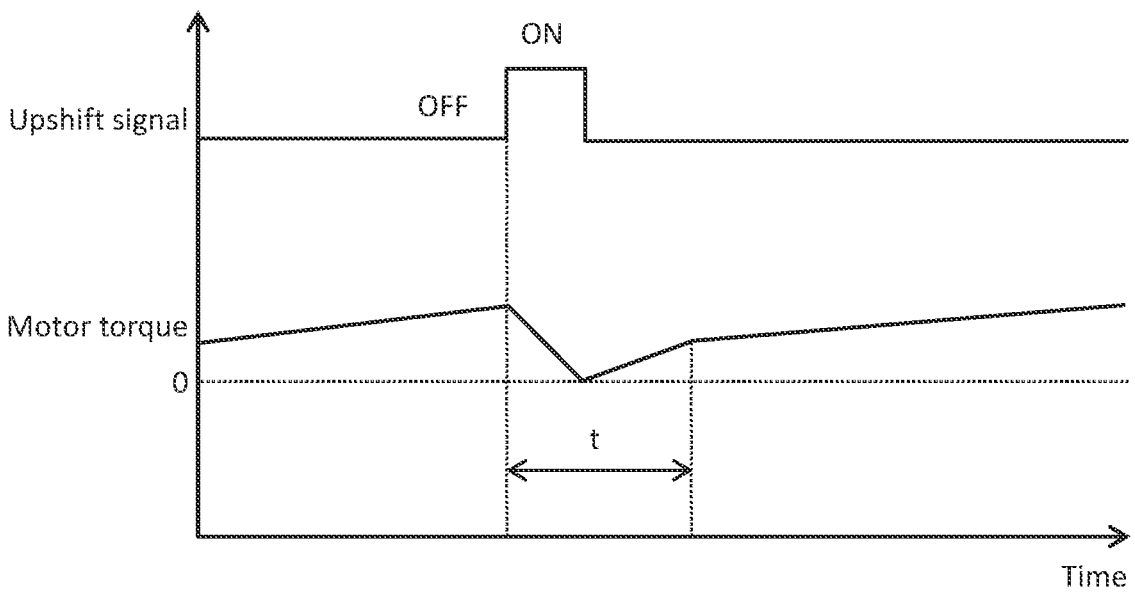
FIG. 10A shows another example of calculation of the motor torque using the clutch pedal-less MT-vehicle model executed in response to upshift operation.
Figure 10B:
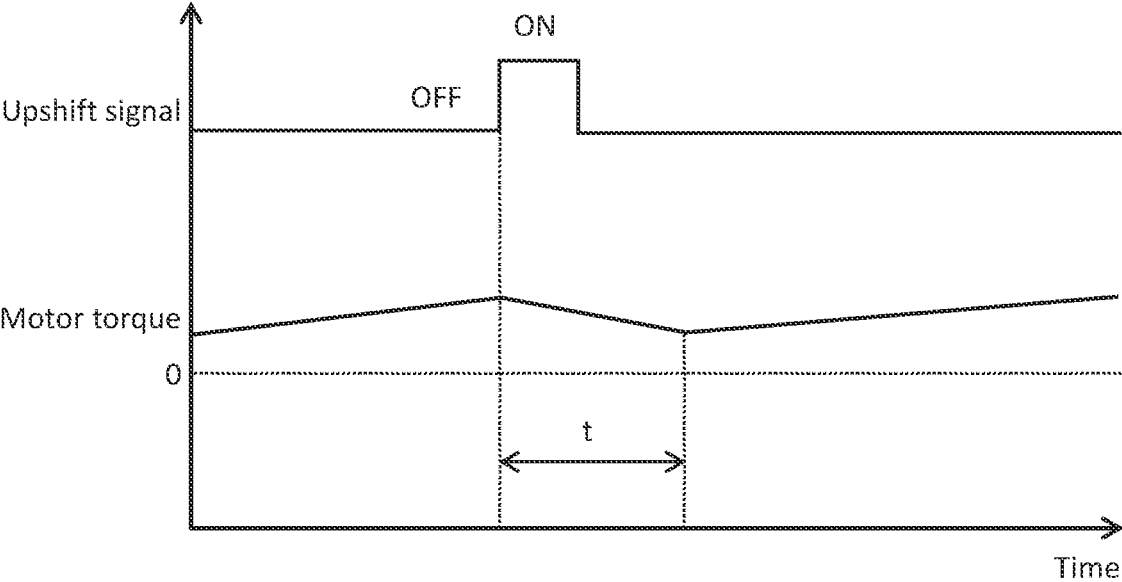
FIG. 10B shows another example of calculation of the motor torque using the clutch pedal-less MT-vehicle model executed in response to upshift operation.

FIGS. 10A and 10B are diagrams showing another example of the calculation of the motor torque using the clutch pedal-less MT-vehicle model 530 executed in response to the upshift operation of the pseudo paddle shifter 26.

In the example shown in FIG. 10A, the motor torque is decreased to the minimum value during the shift time and then increased again, and the motor torque is decreased before and after the elapse of the shift time. The minimum value is zero. With respect to temporary decreasing the motor torque, the example shown in FIG. 10A is common to the example shown in FIG. 9. By temporarily decreasing the motor torque, the driving feeling when the upshift operation of the paddle shifter is performed in the clutch pedal-less MT vehicle is produced.

In the example shown in FIG. 10B, the motor torque is decreased at a constant change rate from the start time point of the upshift to the completion time point of the upshift, and the motor torque is decreased before and after the elapse of the shift time. In the example shown in FIG. 10B, a minimum value is not generated in the motor torque during the shift time unlike the examples shown in FIG. 9 and FIG. 10A. However, the change rate of the motor torque is changed at the start time point of the upshift and the completion time point of the upshift. In other words, the example shown in FIG. 10B is common to the example shown in FIG. 9 and the example shown in FIG. 10A in that the change rate of the motor torque is changed at least twice during the shift time. In each of the examples shown in FIGS. 9, 10A and 10B, the change rate of the motor torque may be changed after a preset delay time has elapsed from the detection of the upshift operation.

According to the clutch pedal-less MT vehicle model 530, the model used for calculating the motor torque can be switched in accordance with the drive mode selected by the drive mode selection switch 42. For example, the change characteristic of the motor torque shown in FIG. 9 may be the change characteristic obtained in A-mode, the change characteristic of the motor torque shown in FIG. 10A may be the change characteristic obtained in B-mode, and the change characteristic of the motor torque shown in FIG. 10B may be the change characteristic obtained in C-mode. Further, for example, the waveform of the change characteristic of the motor torque may be common among the drive modes, and the shift time of the upshift may be different for each drive mode. When the change characteristic of the motor torque is different, the driving feeling received by the driver is also different. By appropriately selecting the drive mode with the drive mode selection switch 42, the driver can arbitrarily obtain a driving feeling suitable for his/her mood or a driving feeling suitable for a driving situation.

3-2. Example of Motor Torque Control in Response to Downshift Operation

Figure 11:
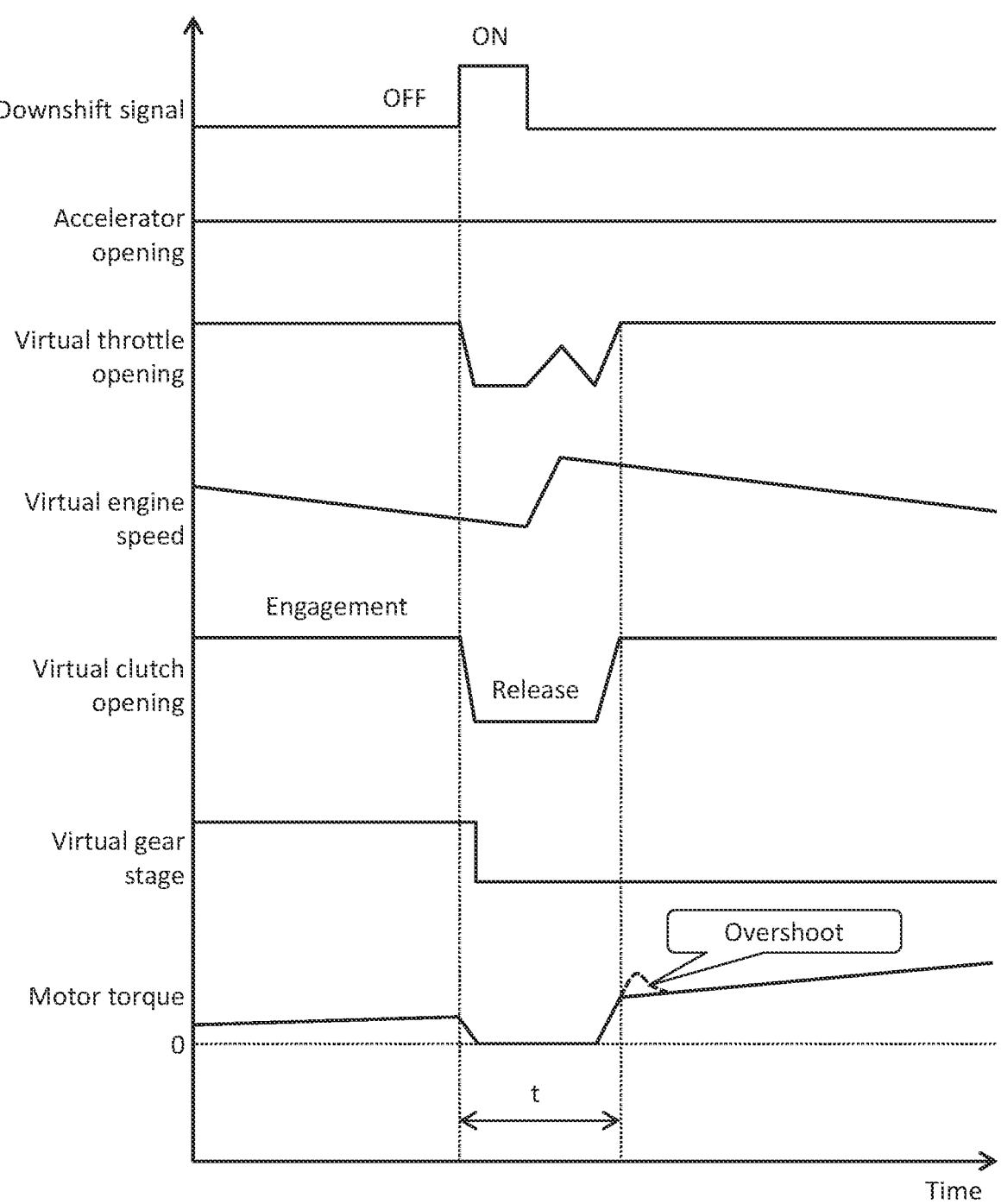
FIG. 11 shows an example of calculation of the motor torque using the clutch pedal-less MT vehicle model executed in response to downshift operation.

FIG. 11 is a diagram showing an example of calculation of the motor torque using the clutch pedal-less MT vehicle model 530 executed in response to the downshift operation of the pseudo paddle shifter 26. In the example shown in FIG. 11, the downshift operation is performed while the accelerator opening is kept constant during deceleration of the electric vehicle 10.

A downshift signal is input from the downshift switch 26d by the downshift operation of the pseudo paddle-shifter 26. In response to the input of the downshift signal, the PCU model 535 of the clutch pedal-less MT vehicle model 530 decreases the virtual throttle opening at a preset speed and simultaneously increases the virtual clutch opening at a preset speed. At substantially the same timing as the timing at which the virtual throttle opening becomes 0% and the virtual throttle is completely closed, the virtual clutch opening becomes 100% and the virtual clutch is completely released.

At the timing when the virtual throttle is completely closed and the virtual clutch is completely released, the PCU model 535 decreases the virtual gear stage of the virtual SMT by one stage. Then, the PCU model 535 temporarily opens the virtual throttle at a timing when a preset time has elapsed after the virtual gear stage is decreased by one stage. Subsequently, the PCU model 535 increases the virtual throttle opening at a preset speed and simultaneously decreases the virtual clutch opening at a preset speed. At substantially the same timing as the timing at which the virtual throttle opening returns to the original opening before the downshift operation, the virtual clutch opening becomes 0% and the virtual clutch is completely engaged. Thus, the downshift of the virtual SMT is completed. In this specification, a time point at which the downshift operation of the pseudo paddle shifter 26 is detected is defined as a start time point of the downshift, and a time point at which the virtual clutch is completely engaged is defined as a completion time point of the downshift. In the present specification, a time (time t shown in FIG. 11) from the start time point of the downshift to the completion time point of the downshift is defined as a shift time of the downshift.

The operation of temporarily opening the virtual throttle while the virtual clutch is released is performed in order to increase the virtual engine speed and match the virtual engine speed with the rotation speed of the input shaft of the virtual SMT determined from the vehicle speed. The engagement of the virtual clutch is started when the difference between the rotation speed of the input shaft of the virtual SMT and the virtual engine speed falls within a preset threshold value. When the downshift operation is performed, the virtual engine speed increases before the virtual clutch is engaged and the motor torque increases. Since such a change in the virtual engine speed is displayed on the pseudo engine speed meter 44, the driver can obtain a driving feeling during downshift from visual information.

The bottom row of FIG. 11 shows changes in the motor torque achieved by changing the virtual throttle opening, the virtual clutch opening, and the virtual gear stage in response to the downshift operation as described above. In the example shown in FIG. 11, the motor torque decreases as the disengagement of the virtual clutch progresses, and decreases to zero at the time point when the virtual clutch is completely disengaged. While the virtual clutch is released, the motor torque is maintained at zero. When the engagement of the virtual clutch is started soon, the motor torque increases as the engagement of the virtual clutch progresses. However, the motor torque at the time point when the virtual clutch is completely engaged and the downshift is completed is made higher than the motor torque at the time point when the downshift is started. That is, in the control of the motor torque in response to the downshift operation, the motor torque is increased before and after the elapse of the shift time. By controlling the motor torque as described above, the driver can enjoy a driving feeling in the electric vehicle 10 as if he/she performs downshift operation using the paddle shifter in the clutch pedal-less MT vehicle.

After completion of the downshift, the motor torque corresponding to the virtual gear stage and the virtual throttle opening is calculated. However, immediately after the elapse of the shift time, the motor torque may be caused to overshoot a target value determined from the virtual gear stage and the virtual throttle opening, as indicated by the broken line in FIG. 11, in consideration of the inertia caused by the rotation of the virtual engine. Alternatively, conversely, the motor torque may be made to undershoot the target value determined from the virtual gear stage and the virtual throttle opening.

Figure 12A:
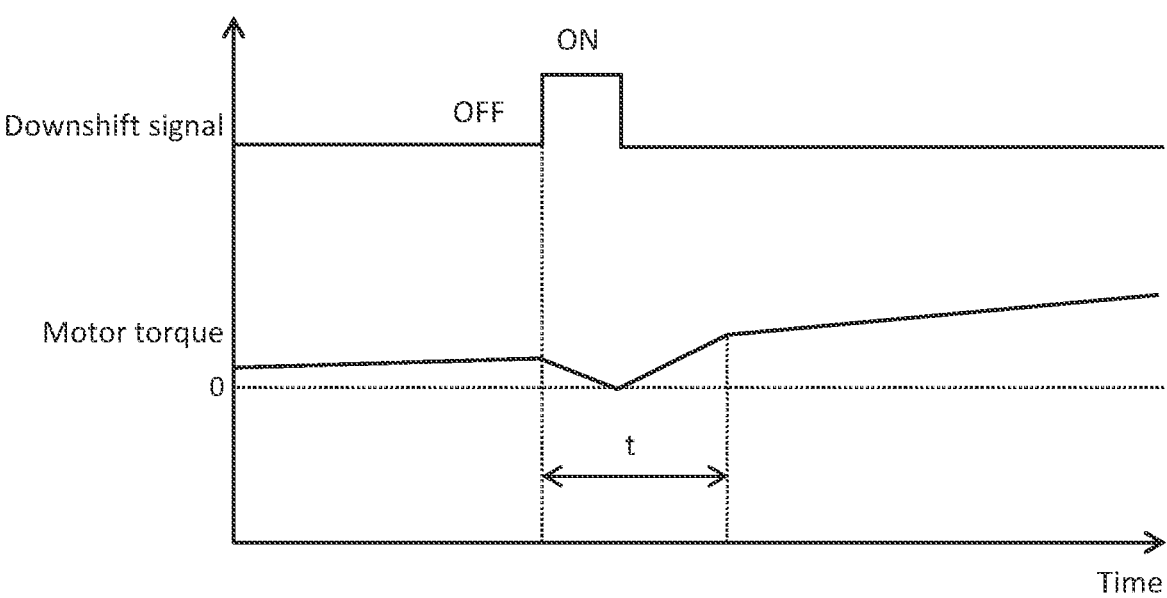
FIG. 12A shows another example of calculation of the motor torque using the clutch pedal-less MT-vehicle model executed in response to downshift operation.
Figure 12B:
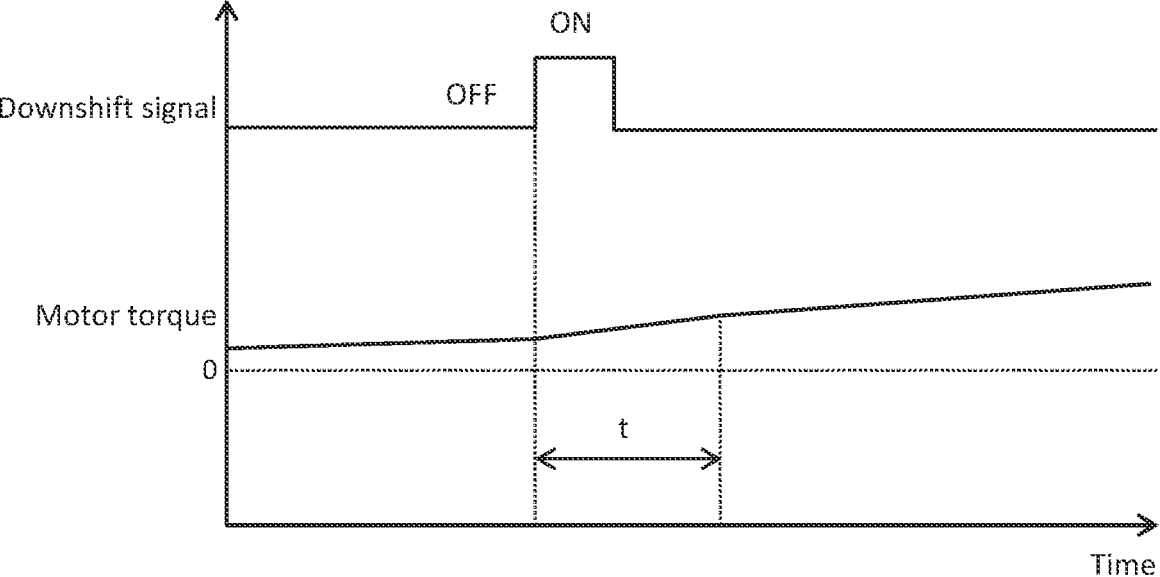
FIG. 12B shows another example of calculation of the motor torque using the clutch pedal-less MT-vehicle model executed in response to downshift operation.

FIGS. 12A and 12B are diagrams showing another example of the calculation of the motor torque using the clutch pedal-less MT-vehicle model 530 executed in response to the downshift operation of the pseudo paddle shifter 26.

In the example shown in FIG. 12A, the motor torque is decreased to the minimum value during the shift time and then increased again, and the motor torque is increased before and after the elapse of the shift time. The minimum value is zero. With respect to temporary decreasing the motor torque, the example shown in FIG. 12A is common to the example shown in FIG. 11. By temporarily decreasing the motor torque, the driving feeling when the downshift operation of the paddle shifter is performed in the clutch pedal-less MT vehicle is produced.

In the example shown in FIG. 12B, the motor torque is decreased at a constant change rate from the start time point of the downshift to the completion time point of the downshift, and the motor torque is increased before and after the elapse of the shift time. In the example shown in FIG. 12B, a minimum value is not generated in the motor torque during the shift time unlike the examples shown in FIG. 11 and FIG. 12A. However, the change rate of the motor torque is changed at the start time point of the downshift and the completion time point of the downshift. In other words, the example shown in FIG. 12B is common to the example shown in FIG. 11 and the example shown in FIG. 12A in that the change rate of the motor torque is changed at least twice during the shift time. In each of the examples shown in FIGS. 11, 12A and 12B, the change rate of the motor torque may be changed after a preset delay time has elapsed from the detection of the downshift operation.

The change characteristics of the motor torque shown in FIGS. 11, 12A, and 12B can be associated with drive modes selectable by the drive mode selection switch 42. For example, the change characteristic of the motor torque shown in FIG. 11 may be the change characteristic obtained in A-mode, the change characteristic of the motor torque shown in FIG. 12A may be the change characteristic obtained in B-mode, and the change characteristic of the motor torque shown in FIG. 12B may be the change characteristic obtained in C-mode. Further, for example, the waveform of the change characteristic of the motor torque may be common among the drive modes, and the shift time of the downshift may be different for each drive mode.

4. Others

Figure 13:
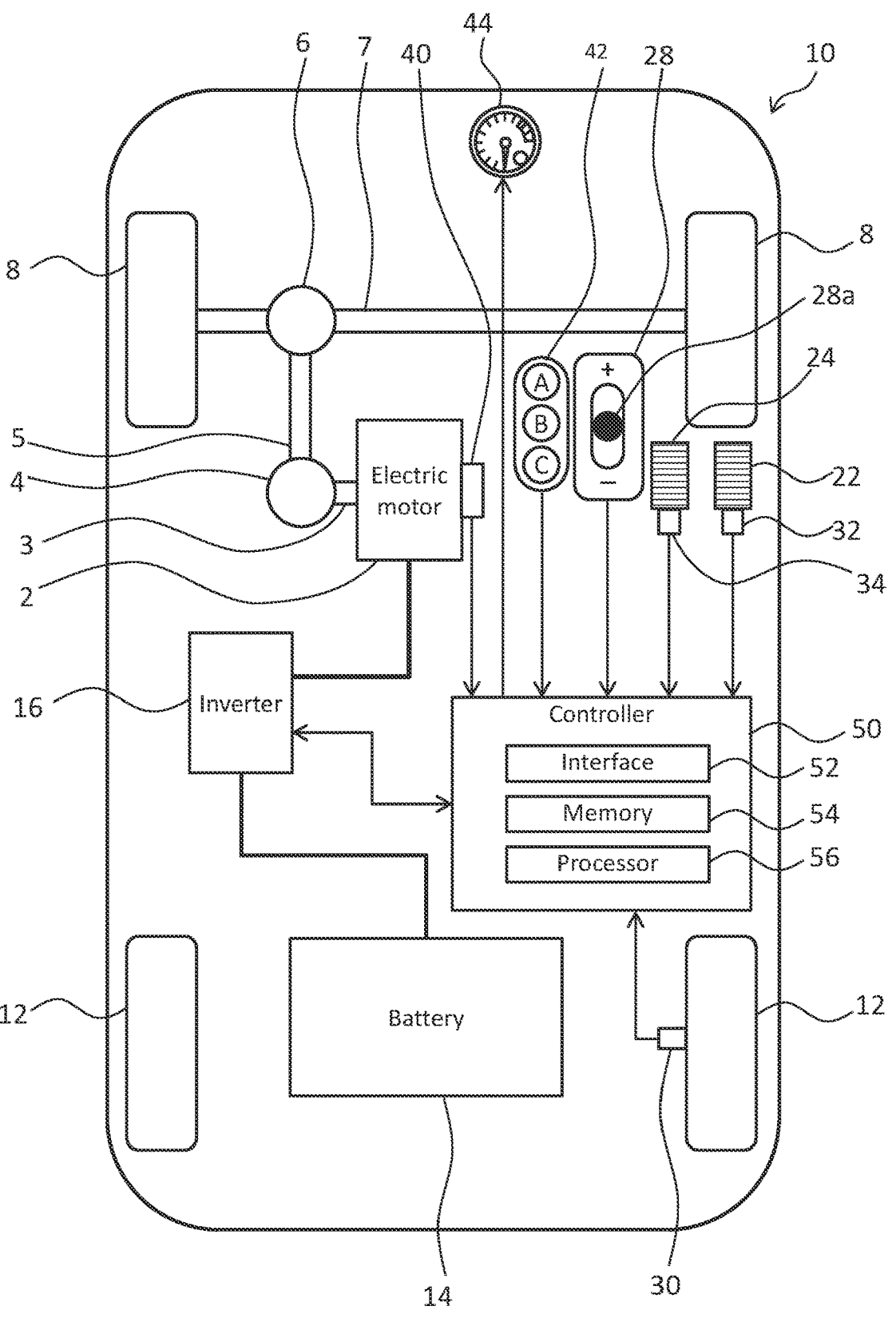
FIG. 13 schematically shows a modified example of the configuration of the electric vehicle according to the embodiment of the present disclosure.

FIG. 13 is a diagram schematically showing a modification of the configuration of the electric vehicle 10 according to the above embodiment. In this modification, a lever-type pseudo shifter 28 is provided as the pseudo sequential shifter. The lever-type pseudo shifter 28 is configured to output an upshift signal when a gearshift lever 28a is tilted forward, and output a downshift signal when the gearshift lever 28a is tilted backward. The lever-type pseudo shifter 28 is connected to the controller 50 via the in-vehicle network.

The electric vehicle 10 according to the above embodiment is an FF vehicle in which the front wheels are driven by the single electric motor 2. However, the present disclosure can also be applied to an electric vehicle in which two electric motors are disposed on the front and rear sides to respectively drive the front wheels and the rear wheels. The present disclosure is also applicable to an electric vehicle including an in-wheel motor in each wheel. A model of an all-wheel drive vehicle with a SMT can be used as the clutch pedal-less MT vehicle model in these cases.

The electric vehicle 10 according to the above embodiment is not provided with a transmission. However, the present disclosure is also applicable to an electric vehicle having a stepped or continuously variable automatic transmission. In this case, the power train including the electric motor and the automatic transmission may be controlled so as to output the motor torque calculated by the clutch pedal-less MT vehicle model.

The motor torque control technique of the present disclosure is not limited to the battery electric vehicle, and is widely applicable to any electric vehicle that uses an electric motor as a power unit for traveling. For example, the motor torque control technique of the present disclosure can be applied to a hybrid electric vehicle (HEV) or a plug-in hybrid electric vehicle (PHEV) having a mode in which the vehicle travels only by driving force of an electric motor. In addition, the motor torque control technique of the present disclosure can be applied to a fuel cell electric vehicle (FCEV) that supplies electric energy generated by a fuel cell to an electric motor.

What is claimed is:

1. An electric vehicle configured to use an electric motor as a power unit for traveling, comprising:
   an accelerator pedal;
   a sequential shifter;
   a controller configured to change a motor torque output by the electric motor in response to operation of the accelerator pedal and operation of the sequential shifter,
   wherein the controller is configured to change a change rate of the motor torque at least twice during a preset shift time in response to the operation of the sequential shifter,
   wherein the controller is configured to decrease the motor torque to a minimum value and then increase the motor torque again during the preset shift time,
   wherein the controller is configured to set the minimum value to zero and maintain the motor torque at zero for a preset time within the preset shift time, and
   wherein the controller is configured to cause the motor torque to overshoot a target value when the preset shift time elapses.

2. The electric vehicle according to claim 1, wherein the controller is configured to change the change rate of the motor torque after elapse of a preset delay time from detection of the operation of the sequential shifter.

3. The electric vehicle according to claim 1, further comprising a drive mode selection switch,
   wherein the controller is configured to change a change characteristic of the motor torque during the preset shift time in accordance with a drive mode selected by the drive mode selection switch.

4. The electric vehicle according to claim 1, wherein the controller is configured to cause a difference in the motor torque in accordance with the shift direction of the sequential shifter before and after elapse of the preset shift time when an operation amount of the accelerator pedal is constant.

5. The electric vehicle according to claim 4, wherein the controller is configured to decrease the motor torque before and after the elapse of the preset shift time when the operation of the sequential shifter is upshift operation.

6. The electric vehicle according to claim 4, wherein the controller is configured to increase the motor torque before and after the elapse of the preset shift time when the operation of the sequential shifter is downshift operation.

7. The electric vehicle according to claim 1, further comprising a pseudo engine speed meter configured to display a virtual engine speed,
   wherein the pseudo engine speed meter is configured to monotonically decrease the virtual engine speed during the preset shift time in response to upshift operation of the sequential shifter.

8. The electric vehicle according to claim 1, further comprising a pseudo engine speed meter configured to display a virtual engine speed, wherein the pseudo engine speed meter is configured to increase the virtual engine speed at a preset timing within the preset shift time in response to downshift operation of the sequential shifter.

9. The electric vehicle according to claim 1, wherein the sequential shifter is a paddle shifter.

10. The electric vehicle according to claim 1, wherein the sequential shifter is a lever shifter.

11. The electric vehicle according to claim 1, wherein the electric vehicle is a clutch pedal-less vehicle.

12. The electric vehicle according to claim 1, wherein the controller includes a memory storing a clutch pedal-less MT vehicle model, and a processor coupled to the memory, the clutch-pedal-less MT vehicle model is a model simulating output characteristics of driving wheel torque in a clutch pedal-less MT vehicle including an internal combustion engine whose engine torque is controlled by operation of a gas pedal, a sequential manual transmission whose gear stage is switched by operation of a shifter, and a clutch that connects the internal combustion engine and the sequential manual transmission, in which temporary cutting of the engine torque and engagement and disengagement of the clutch are automatically performed in response to the operation of the shifter, and the processor is configured to execute receiving the operation of the accelerator pedal as an input of the operation of the gas pedal with respect to the clutch pedal-less MT vehicle model, receiving the operation of the sequential shifter as an input of the operation of the shifter with respect to the clutch pedal-less MT vehicle model, calculating the driving wheel torque determined by the engine torque, the gear stage, and the connection state of the clutch based on the input of the operation of the gas pedal and the input of the operation of the shifter using the clutch pedal-less MT vehicle model, and changing the motor torque so as to apply the driving wheel torque to driving wheels of the electric vehicle.

13. The electric vehicle according to claim 12, further comprising a drive mode selection switch, wherein the clutch pedal-less MT vehicle model includes a plurality of models simulating clutch pedal-less MT vehicles having different output characteristics, and the controller is configured to select one model from the plurality of models in accordance with a drive mode selected by the drive mode selection switch.

14. The electric vehicle according to claim 12, further comprising a pseudo engine speed meter configured to display a virtual engine speed, wherein the controller is configured to further execute causing the pseudo engine speed meter to display an engine speed of the internal combustion engine calculated using the clutch pedal-less MT vehicle model as the virtual engine speed.

* * * * *